United States Patent [19]

Reardon

[11] 4,395,015
[45] Jul. 26, 1983

[54] CAKE MOLD

[76] Inventor: Margaret Reardon, 8 Kimball St., Worcester, Mass. 01605

[21] Appl. No.: 332,848

[22] Filed: Dec. 21, 1981

[51] Int. Cl.³ .............................................. B28D 7/36
[52] U.S. Cl. .................................... 249/115; D7/357; 99/DIG. 15; 249/125; 249/DIG. 1; 426/275
[58] Field of Search ................. 249/57, 115, 117, 119, 249/129, DIG. 1, 82, 84, 85, 92, 122, 131, 132, 125; 425/DIG. 42; 99/432, 442, 353, DIG. 15; 220/427, 430, 20, 21, 22; 426/275, 283, 302, 505; D7/142, 357

[56] References Cited

U.S. PATENT DOCUMENTS

| | | | |
|---|---|---|---|
| 973,684 | 10/1910 | Thompson-Meaves | 220/20 |
| 1,476,910 | 12/1923 | Naugle | 249/DIG. 1 |
| 1,531,569 | 3/1925 | Rade | 249/DIG. 1 |
| 1,624,941 | 4/1927 | Fulkerson | 249/DIG. 1 |
| 2,028,671 | 1/1936 | Kollman | 249/DIG. 1 |
| 2,039,374 | 5/1936 | Young | 249/DIG. 1 |
| 2,290,396 | 7/1942 | Webster | 249/DIG. 1 |
| 2,529,354 | 11/1950 | Schroeder | 249/DIG. 1 |
| 3,116,523 | 1/1964 | Barber | 249/129 X |
| 3,191,520 | 6/1965 | Halter | 249/DIG. 1 |
| 3,406,430 | 10/1968 | Furstenburg et al. | 425/DIG. 42 |
| 3,473,489 | 12/1966 | Sargent | 426/275 |
| 3,727,875 | 4/1973 | Downing | 249/115 X |
| 3,761,047 | 9/1973 | Mao | 249/115 |
| 4,268,002 | 5/1981 | Deveaux | 249/129 X |

Primary Examiner—Jay H. Woo
Assistant Examiner—Joel S. Baden
Attorney, Agent, or Firm—Blodgett & Blodgett

[57] ABSTRACT

Mold for cakes having an annular side wall and a plurality of concentric inner annular dividing walls with heights which are approximately half the height of the side wall, which are tapered upwardly, and which are coated with polytetrafluoroethylene (Teflon).

3 Claims, 3 Drawing Figures

CAKE MOLD

BACKGROUND OF THE INVENTION

In the art of baking, it is common practice to make a cake having a plurality of layers. Usually these layers are horizontal, i.e., the dividing surfaces extend transversely of the cylindrical cake. It has been suggested in the past that a very desirable multi-layered cake could be made with the layers coaxial of the cake, particularly if the layers were made of different cake materials. For this purpose, a special bake pan or cake mold has been suggested, having a plurality of concentric annular walls within the pan. In baking with such a contrivance, however, the cake expands during baking and extrudes out of the top of the pan into a misshapen mass which is not regular in shape or pleasing to the eye. These and other difficulties experienced with the prior art devices have been obviated in a novel manner by the present invention.

It is, therefore, an outstanding object of the invention to provide cake molds capable of readily forming a cake with concentric layers.

Another object of this invention is the provision of a cake mold in which the shape of the cake is maintained in a predetermined shape, irrespective of the fact that it is made up of several layers of various cake materials.

A further object of the present invention is the provision of a cake mold in which a plurality of layers are carefully formed to be perfectly concentric with the exterior periphery.

It is another object of the instant invention to provide a cake mold so formed that the cake can be easily removed intact.

A still further object of the invention is the provision of a cake mold in which a multi-layered cake can be formed having an aesthetically perfect appearance.

It is a further object of the invention to provide a cake mold which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a cake mold having a main container with a bottom wall whose periphery is circular and with an annular sidewall rising vertically from that periphery. A first annular division wall extends upwardly from the bottom wall, coaxially of the sidewall, the division wall having a height approximately one-half that of the sidewall.

More specifically, a second annular division wall is located between the said division wall and sidewall and has the same height as the division wall. The division walls taper inwardly in the upward direction and are coated with Teflon.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
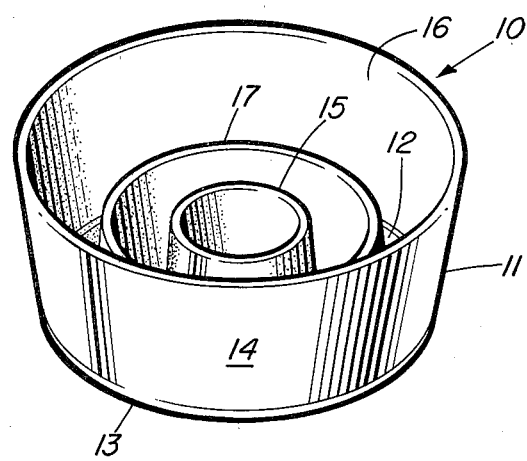
FIG. 1 is a perspective view of a cake mold embodying the principles of the present invention.

Referring first to FIG. 1, wherein are best shown the general features of the invention, it can be seen that the cake mold, indicated generally by the reference numeral 10, is provided with a main container 11 having a bottom wall 12. The bottom wall is provided with a circular periphery and from this periphery rises an integral sidewall 14. An integral annular division wall 15 also rises from the bottom wall 12. The division wall is coaxial of the sidewall 14 and has a vertical height which is substantially less than that of the sidewall 14. In the preferred embodiment, this height is approximately one-half the height of the sidewall 14 and the mold is formed of aluminum.

Figure 2:
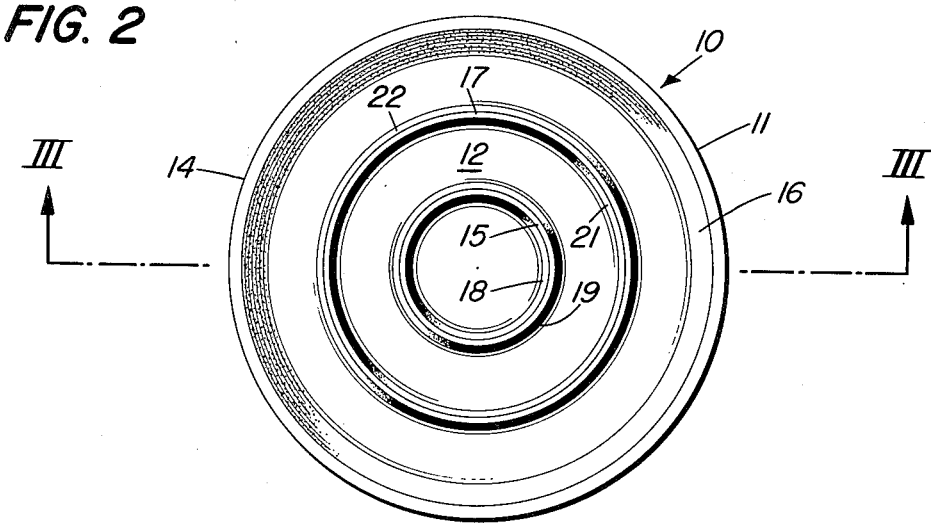
FIG. 2 is a top plan view of the cake mold.
Figure 3:
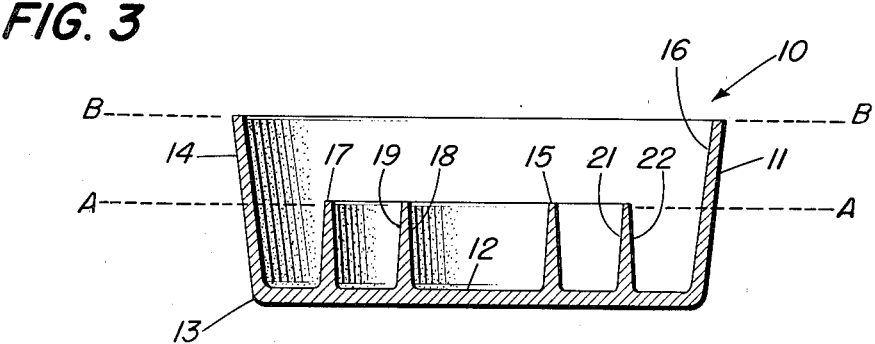
FIG. 3 is a vertical sectional view of the cake mold taken on the line III—III of FIG. 2.

FIGS. 2 and 3 show the details of the invention, including the fact that the sidewall 12 has an inner surface 16 which tapers outwardly and upwardly or, in other words, has a frusto-conical confirmation. A second annular division wall 17 is located coaxially of the sidewall 12 and lies between the sidewall and the first mentioned annular division wall 15. It extends to the same vertical height as the first-mentioned division wall, that is to say, approximately one-half that of the sidewall 12. As is best shown in FIG. 3, the division walls 15 and 17 are tapered inwardly and upwardly from the bottom wall. The first division wall 15 is defined between two frusto-conical surfaces 18 and 19, while the division wall 17 is defined by two frusto-conical surfaces 21 and 22. These surfaces, particularly the surfaces of the division walls 15 and 17 are coated with polytetrafluoroethylene (Teflon).

The operation and the advantages of the invention will now be readily understood in view of the above description. In use, the cake mold is used to bake a cake having different types of cake material in concentric rings or layers. A first type of cake batter is placed in the space within the division wall 15, defined by the surface 18 and the inner surface of the bottom 12. A second type of cake batter is placed in the annular space between the walls 15 and 17, this being the space defined by the surfaces 19 and 21. Finally, a third type of cake batter is placed in the space between the outer division wall 17 and the sidewall 12, that is, the space defined by the surfaces 22 and 16. The level of the batter is selected to be just the level indicated by the line A—A in FIG. 3 which includes the upper edges of the division walls 15 and 17. The cake mold with its contents is then placed in the oven and baked. As baking takes place, the cake batter rises and fills a considerable portion of the space in the main container 11, as defined by the inner surface 16. As this occurs, the various cake batters impinge on one another above the upper edge of the division walls 15 and 17. The cake batter rises and the division separating surfaces come together to form a homogeneous cake. Furthermore, a certain amount of lateral compression takes place in the portions of the cake batter that remain in the three spaces provided.

Eventually, when baking has been completed, the cake mold is removed from the oven and inverted on a flat surface. Because of the Teflon coating, the cake slides easily from the cake mold and because of the compression in the original portions of the batter, the gap between them caused by the division walls disappears and the rings come together. It can be seen, then, that the result is a cake which, because of the different types of batter used in the various layers can be very interesting from an aesthetic as well as a taste point of view. By selecting cake batter of different colors, the appearance is quite remarkable. By selecting carefully the different flavors, eating of the cake can be a pleasurable experience. If a wedge-shaped piece of cake is cut from the product, it will have all three segments of the cake material in the single wedge.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Cake mold, comprising:

(a) a main container having a bottom wall with a circular peripheral edge and having an annular side wall extending upwardly and outwardly from the said peripheral edge of the bottom wall to define a primary top opening, and
   (b) an annular division wall extending upwardly from the bottom wall coaxially of the side wall and terminating in a free top edge to define a secondary top opening, the division wall being tapered inwardly and upwardly from the bottom wall and having a height which is substantially less than that of the side wall.

2. Cake mold as recited in claim 1, wherein a second annular division wall is located between the above-recited division wall and the side wall and has the same height and taper as the division wall.

3. Cake mold as recited in claim 1, wherein the device is formed as an integral member of aluminum and the surfaces of the division wall are coated with polytetraflouroethylene.

* * * * *